United States Patent [19]

Glaspell

[11] 3,821,876
[45] July 2, 1974

[54] SEALED HYDRAULIC RESERVOIR
[76] Inventor: Charles A. Glaspell, Rt. No. 5, Fairmont, W. Va. 26554
[22] Filed: May 18, 1973
[21] Appl. No.: 361,563

[52] U.S. Cl.................... 55/385, 92/78, 220/85 B
[51] Int. Cl............................................ B01d 46/10
[58] Field of Search............ 55/383, 385; 92/45, 78; 220/85 B, 85 A

[56] References Cited
UNITED STATES PATENTS
2,378,467   6/1945   Kiss................................... 220/85 B
2,841,674   7/1958   Bourhs et al....................... 92/45 X Primary Examiner—Frank A. Spear, Jr.
Attorney, Agent, or Firm—Victor J. Evans & Co.

[57] ABSTRACT

A sealed hydraulic reservoir having a bellows seal against the surface of the fluid in the reservoir to permit the fluid to raise and fall in the reservoir without contact with outside air. A filter overlies the bellows to filter the air reaching the top of the bellows to prevent dirt from coming in contact with the bellows to damage the bellows. The filler cap for the reservoir is supported on posts extending upwardly from the bottom of the reservoir.

2 Claims, 2 Drawing Figures

PATENTED JUL 2 1974 3,821,876

SEALED HYDRAULIC RESERVOIR

BACKGROUND OF THE INVENTION

Field of the Invention

The present invention relates to a sealed hydraulic reservoir for use with hydraulic equipment.

SUMMARY OF THE INVENTION

The sealed reservoir includes a container having a bellows extending across the top thereof and attached to a central filler cap supported on posts extending upwardly from the base of the reservoir. An air filter extends across the top of the reservoir to filter air reaching the top side of the bellows to prevent damaging dirt from coming in contact with the bellows.

The primary object of the invention is to provide a sealed reservoir for hydraulic fluids which will permit the flow of fluids to and from the reservoir while preventing contact of air with the hydraulic fluid.

Other objects and advantages will become apparent in the following specification when considered in light of the attached drawings.

DESCRIPTION OF THE PREFERRED EMBODIMENT

Figure 1:
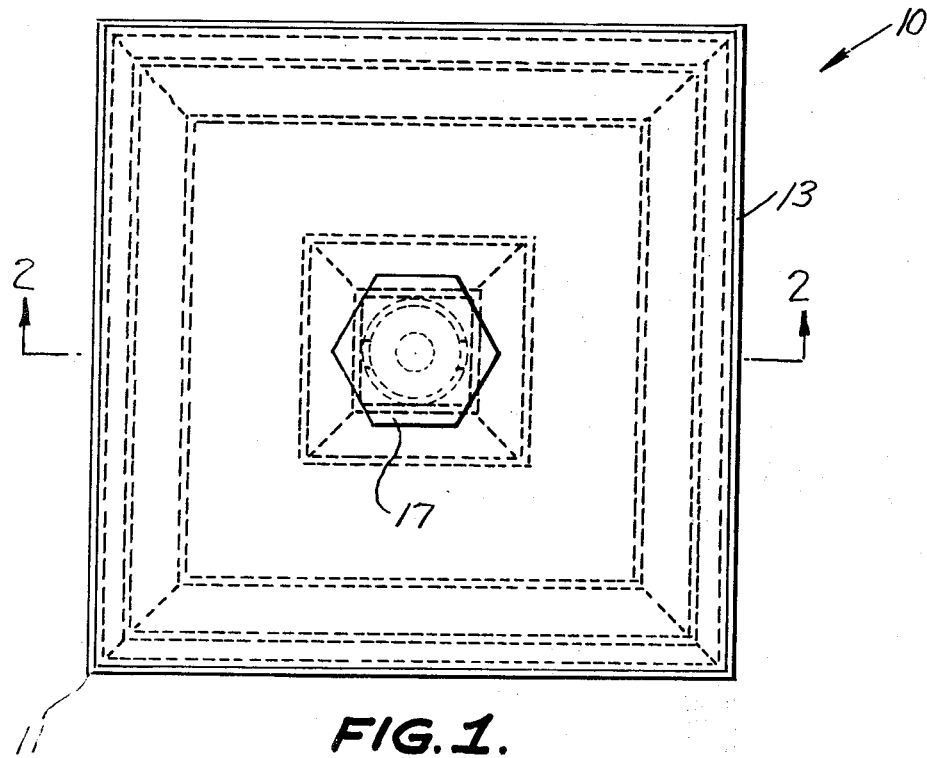
FIG. 1 is a top plan view of the invention.
Figure 2:
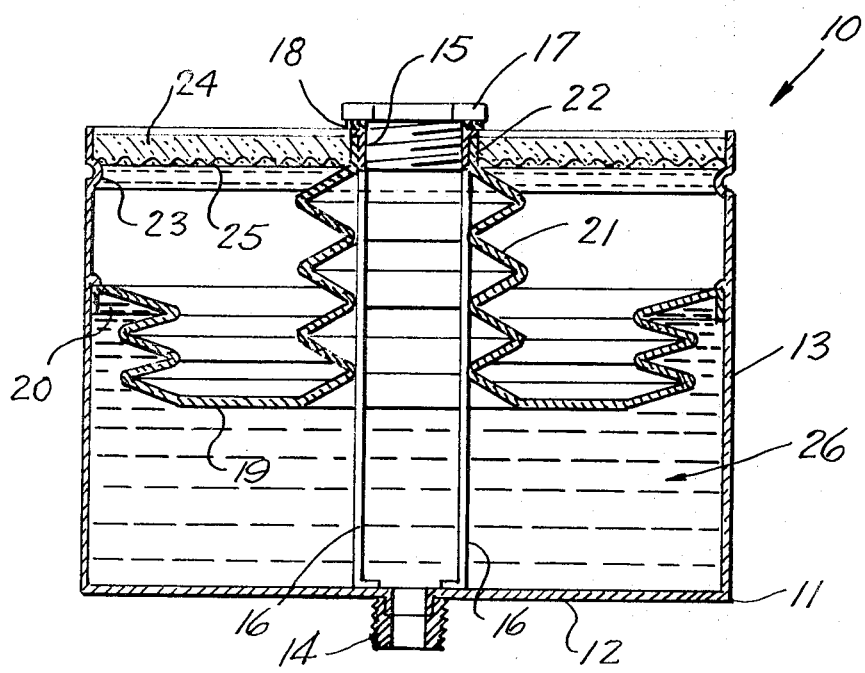
FIG. 2 is a vertical sectional view, taken along the line 2—2 of FIG. 1, looking in the direction of the arrows.

Referring now to the drawings in detail, wherein like reference characters indicate like parts throughout the several figures, the reference numeral 10 indicates generally a sealed hydraulic reservoir constructed in accordance with the invention.

The sealed hydraulic reservoir 10 includes a container 11 having a bottom wall 12 and upright side walls 13 integrally secured to the bottom wall 12.

An outlet fitting 14 is secured to the bottom wall 12 in sealed relation thereto to permit the reservoir 10 to be connected to the hydraulic lines of hydraulic apparatus (not shown).

An internally threaded filler neck 15 is mounted on a pair of posts 16 secured to the bottom wall 12 and extending upwardly therefrom in spaced parallel relation. A filler cap 17 is threaded into the filler neck 15 and has a sealing gasket 18 positioned between the cap 17 and the neck 15.

A bellows 19 is positioned in the container 11 and has its outer edge 20 attached to the side walls 13 in sealed relation thereto spaced below the top edges of the side wall 13. The bellows 19 has an upwardly extending central portion 21 terminating in a flange 22 which is secured to the filler neck 15 in sealed relation.

The side walls 13 have a bead 23 extending inwardly thereof adjacent the upper edge of the side walls 13. An air filter 24 including the metallic screen 25 is supported in a generally horizontal relation on the bead 23 adjacent the top edge of the wall 13. The filter 24 tightly engages the side walls 13 and the flange 22 of the bellows 21 so that any air reaching the top of the bellows 19 must flow through the air filter 24.

In the use and operation of the invention the container 11 is filled with hydraulic oil generally indicated at 26 with the fitting 14 connected into the hydraulic circuits of hydraulic equipment. As hydraulic oil flows to the hydraulic equipment air flowing through the filter 24 presses against the top of the bellows 19 and moves the bellows 19 downwardly so that it stays in contact with the upper surface of the hydraulic oil 26. As the hydraulic oil 26 returns to the reservoir 10 the bellows 19 will be moved upwardly thereby with the air thereabove moved outwardly through the filter 24.

In conventional hydraulic reservoirs air flows in on top of the hydraulic oil as the oil leaves the reservoir and is expelled from the reservoir as oil returns to the reservoir. In such instances grit and other polluting material in the air is permitted to enter the hydraulic oil and be carried thereby into the hydraulic equipment to thus damage the hydraulic equipment. With the present invention the air never is in contact with the hydraulic oil and hence no transfer of grit or other pollutents can take place between the air and the hydraulic oil.

Having thus described the preferred embodiment of the invention it should be understood that numerous structural modifications and adaptations may be resorted to without departing from the spirit of the invention.

What is claimed is:

1. A sealed hydraulic reservoir comprising a container having a generally horizontal bottom wall and side walls secured to said bottom wall and extending upwardly therefrom, a bellows secured to said side wall for contact with the top surface of hydraulic fluid in said container, a filler neck secured to said bellows, a pair of posts mounted on said bottom wall supporting said filler neck at the top of said container, and a generally horizontal filter extending across the top of said container for filtering the air engaging the upper side of said bellows.

2. A device as claimed in claim 1 wherein said bellows includes an upwardly extending central portion secured to said filler neck.

* * * * *